United States Patent [19]

Jorgensen

[11] Patent Number: 5,680,947
[45] Date of Patent: Oct. 28, 1997

[54] FOLDABLE ELECTRICAL BOX

[75] Inventor: Robert W. Jorgensen, Niles, Mich.

[73] Assignee: Hubbell Incorporated, Orange, Conn.

[21] Appl. No.: 676,819

[22] Filed: Jul. 8, 1996

Related U.S. Application Data

[63] Continuation of Ser. No. 479,766, Jun. 7, 1995, abandoned, which is a continuation of Ser. No. 415,579, Mar. 31, 1995, Pat. No. 5,480,053, which is a continuation of Ser. No. 151,929, Nov. 15, 1993, abandoned.

[51] Int. Cl.[6] .................................... H02G 3/00
[52] U.S. Cl. .................................. 220/3.9; 220/3.2
[58] Field of Search ..................... 220/3.2, 3.9, 3.94

[56] References Cited

U.S. PATENT DOCUMENTS

| | | | |
|---|---|---|---|
| 16,226 | 12/1856 | Beach | 220/692 |
| 1,705,768 | 3/1929 | Johnson et al. | |
| 1,929,844 | 10/1933 | Haas | 247/16 |
| 2,214,968 | 9/1940 | MacMillen | 220/3.9 |
| 2,644,600 | 7/1953 | Senif | 220/3.9 |
| 3,588,017 | 6/1971 | O'Brien | 220/3.9 |
| 3,588,019 | 6/1971 | Cozeck et al. | 220/3.9 |
| 3,802,634 | 4/1974 | Everett | 220/3.9 |
| 3,834,658 | 9/1974 | Theodorides | 248/205 |
| 3,846,604 | 11/1974 | Shallbetter | 200/168 |
| 3,863,037 | 1/1975 | Schindler et al. | 174/58 |
| 4,135,337 | 1/1979 | Medlin | 52/221 |
| 4,140,293 | 2/1979 | Hansen | 248/217.2 |
| 4,438,859 | 3/1984 | Solek | 220/3.2 |
| 4,447,030 | 5/1984 | Nattel | 248/27.1 |
| 4,533,060 | 8/1985 | Medlin | 220/3.9 |
| 4,572,391 | 2/1986 | Medlin | 220/3.9 |
| 4,603,789 | 8/1986 | Medlin, Sr. | 220/3.9 |
| 4,880,128 | 11/1989 | Jorgensen | 220/3.9 |
| 5,025,944 | 6/1991 | Rodick | 220/3.9 |

OTHER PUBLICATIONS

Raco Electrical Products Catalog —R-192, 1992, pp. B15 –B17.

*Primary Examiner*—Steven M. Pollard
*Attorney, Agent, or Firm*—Jerry M. Presson; David L. Tarnoff

[57] ABSTRACT

A folded electrical box for mounting an electrical wiring device to a support member. Preferably, the electrical box is formed by folding a unitary blank of thin sheet material. In the preferred embodiment, the electrical box includes an integral mounting bracket. The mounting bracket has a pair of bracket portions extending outwardly from one side wall of the electrical box for coupling the electrical box to a support member. Each of the bracket portions has side mounting section extending from the electrical box for engaging one side of the support member extending perpendicular to the dry wall plaster and a face mounting section extending substantially perpendicularly from the side mounting section for engaging the side of the support member with the dry wall plaster secured thereto. The side mounting section of the mounting bracket is reinforced by folding the sheet material to double its thickness, while the face mounting section has a single thickness to avoid bulging the dry wall plaster. In another embodiment, the mounting bracket is replaced by a pair of fasteners or nails which extend through the electrical box to add rigidity and to prevent unfolding of the box.

6 Claims, 6 Drawing Sheets

FOLDABLE ELECTRICAL BOX

This is a continuation of application Ser. No. 08/479,766 filed Jun. 7, 1995, now abandoned, which is a continuation of application Ser. No. 08/415,579 filed Mar. 31, 1995 now, U.S. Pat. No. 5,480,053, which is a continuation of application Ser. No. 08/151,929 filed Nov. 15, 1993, now abandoned.

FIELD OF THE INVENTION

The present invention relates to an electrical box for mounting an electrical wiring device to a support member. More specifically, this invention relates to an electrical box folded from a thin metallic blank of sheet material. Preferably, the electrical box includes an integral mounting bracket, or mounting fasteners which also reinforces the electrical box.

BACKGROUND OF THE INVENTION

Electrical boxes are constructed in a variety of ways for housing electrical wiring devices such as electrical receptacles or outlets, switches, etc. Electrical boxes can be constructed of either metal or plastic depending upon the desired application for the electrical box.

Often, electrical boxes have a bracket or some other mounting structure for securing the electrical box to a stud or some other support member. Since numerous electrical boxes are typically installed in a building or house, it is important that the electrical box as well as the mounting structure be inexpensive to manufacture, easy to install and reliable.

Metal electrical boxes are typically constructed of sheet metal or die casted of aluminum or any other suitable metallic material. Sheet metal electrical boxes can be formed by bending, welding and otherwise fastening metal panels together to form a box with an open end. The mounting bracket is typically welded to one side of the electrical box or attached to the electrical box by screws or other fasteners. Some sheet metal electrical boxes have the bracket integrally formed with one side of the electrical box.

Examples of some prior electrical boxes with mounting brackets are disclosed in the following U.S. Pat. Nos.: 1,705,768 to Johnson et al; 2,644,600 to Senif; 3,588,019 to Cozeck et al; 3,834,658 to Theodorides; 4,135,337 to Medlin; 4,140,293 to Hansen; 4,447,030 to Nattel; 4,533,060 to Medlin; 4,572,391 to Medlin; 4,603,789 to Medlin, Sr.; 4,880,128 to Jorgensen; and 5,025,944 to Rodick.

Many of these electrical boxes with mounting brackets have numerous disadvantages. For example, many of these electrical boxes with brackets are very complex designs which are difficult to install, require close manufacturing tolerances and are difficult to manufacture at low costs. In addition, many of the mounting brackets of these electrical boxes cause the finished dry wall plaster to bulge.

In view of the above, it is apparent that there exists a need to provide an electrical box with a mounting bracket which is relatively inexpensive to manufacture and easy to install. This invention addresses this need in the art along with other needs which will become apparent to those skilled in the art once given this disclosure.

SUMMARY OF THE INVENTION

A primary object of the subject invention is to provide an electrical box formed by folding a thin sheet of material.

A further object of the invention is to provide an electrical box which is relatively inexpensive and simple to manufacture.

A further object of the invention is to provide an electrical box which minimizes waste during manufacture thereof.

Still another object of the present invention is to provide an electrical box which is easy to install and reliable.

Still another object of the invention is to provide an electrical box with a mounting bracket having a thin mounting tab to avoid bulging the dry wall plaster.

Yet another object of the invention is to provide a foldable electrical box with mounting fasteners which also reinforces the electrical box and prevents unfolding of the electrical box.

The foregoing objects are basically attained by providing an electrical box assembly formed by folding a unitary blank of sheet material, comprising: an electrical box including a first substantially planar panel, a second substantially planar panel coupled to the first panel by a first fold line and extending substantially perpendicular to the first panel, a third substantially planar panel coupled to the first panel by a second fold line and extending substantially perpendicular to the first panel, a fourth substantially planar panel coupled to the first panel by a third fold line and extending substantially perpendicular to the first panel, and a fifth substantially planar panel coupled to the first panel by a fourth fold line and extending substantially perpendicular to the first panel; and a mounting bracket including a first bracket portion extending from the second panel in a first direction for mounting the electrical box to a support member, a first reinforcing panel coupled to the first bracket portion by a fifth fold line to overlie a part of the first bracket portion, a second bracket portion extending from the second panel in a second direction substantially opposite to the first direction for mounting the electrical box to the support member, and a second reinforcing panel coupled to the second bracket portion by a sixth fold line to overlie a part of the second bracket portion.

Other objects, advantages, and salient features of the invention will become apparent from the following detailed description, which, taken in conjunction with the annexed drawings, discloses several preferred embodiments of the invention.

BRIEF DESCRIPTION OF THE DRAWINGS

Referring now to the drawings which form part of this original disclosure.

DETAILED DESCRIPTION OF THE INVENTION

Figure 1:
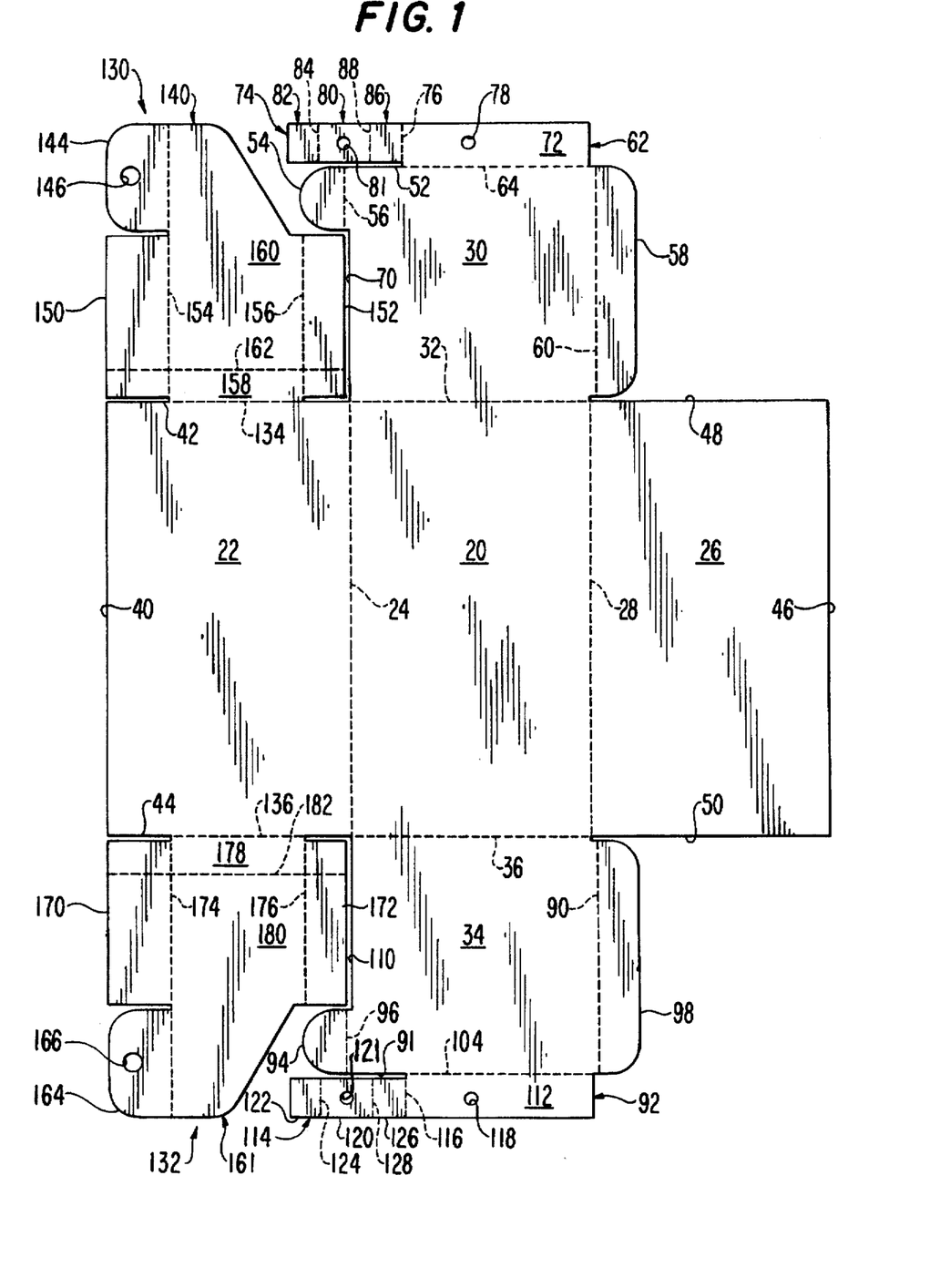
FIG. 1 is a top plan view of a unitary blank of sheet material with fold lines indicated by broken lines for constructing an electrical box with a mounting bracket in accordance with a first embodiment of the present invention.
Figure 2:
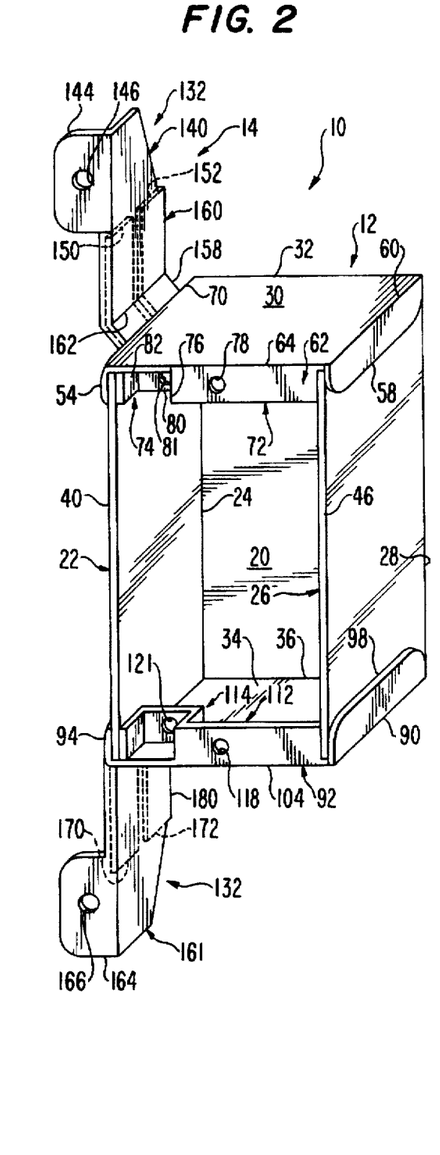
FIG. 2 is a right, front perspective view of an electrical box with a mounting bracket formed by folding the unitary blank of sheet material illustrated in FIG. 1.
Figure 3:
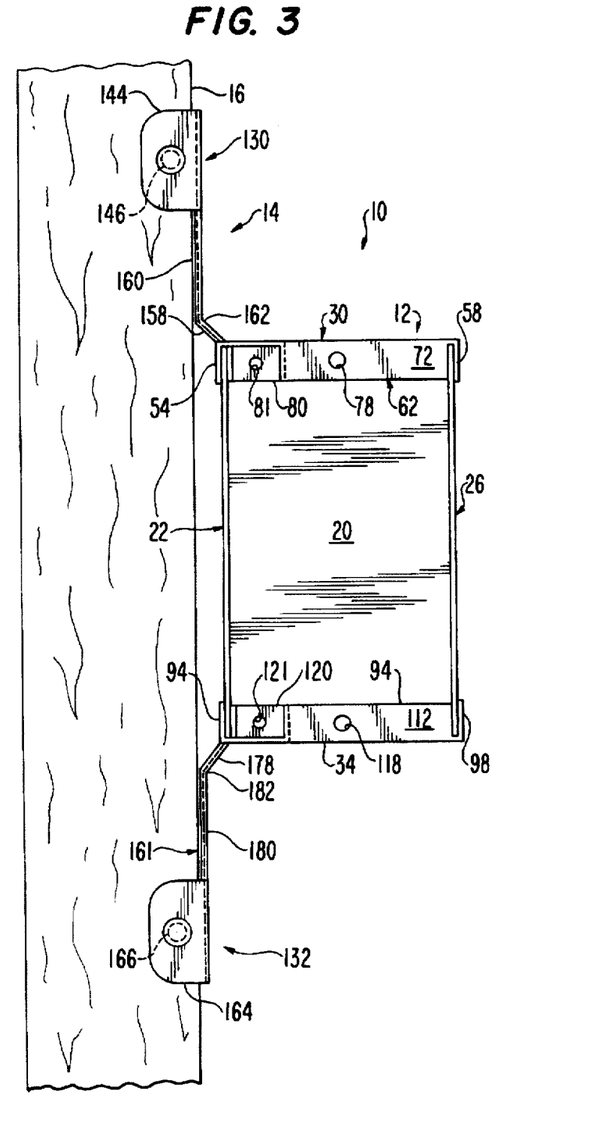
FIG. 3 is a front elevational view of the electrical box and integral mounting bracket coupled to a stud or support member.
Figure 4:
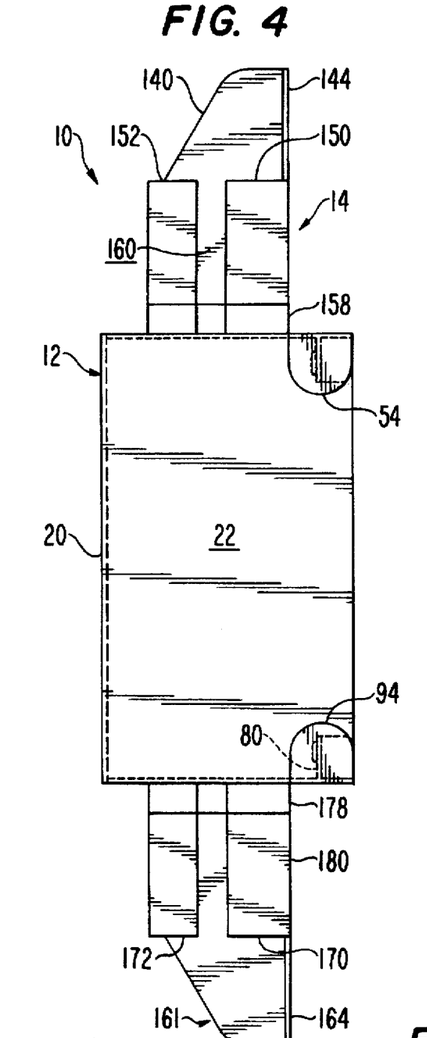
FIG. 4 is a left side elevational view of the electrical box and integral mounting bracket illustrated in FIGS. 2 and 3.
Figure 5:
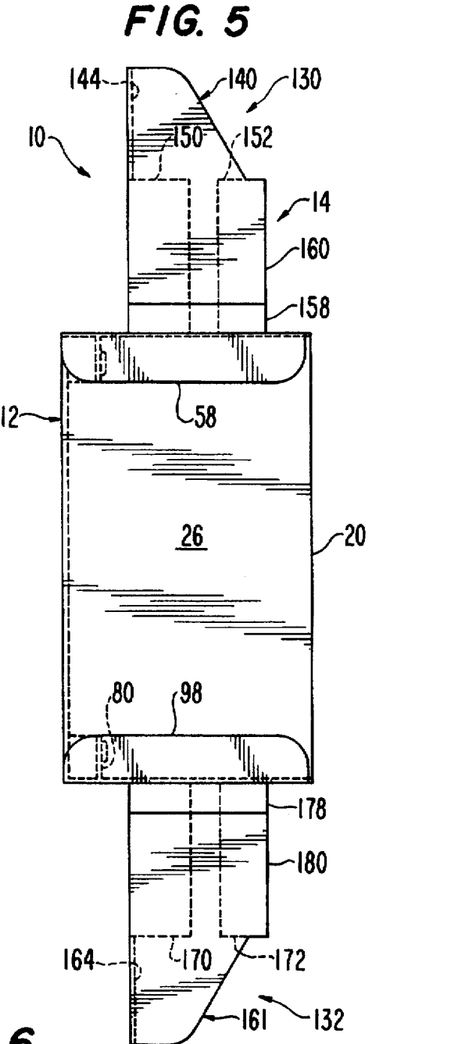
FIG. 5 is a right side elevational view of the electrical box and integral mounting bracket illustrated in FIGS. 2-4.
Figure 6:
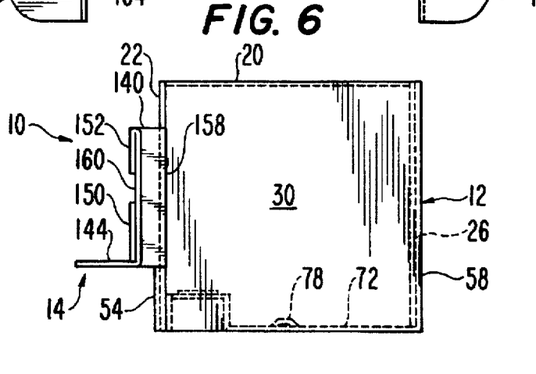
FIG. 6 is a top plan view of the electrical box and integral mounting bracket illustrated in FIGS. 2-5.

Initially referring to FIGS. 1 and 2, an electrical box assembly 10 in accordance with the present invention is illustrated, and includes an electrical box or housing 12 in the form of a wall or junction box and an integral mounting bracket 14 formed by folding a unitary, one-piece blank of sheet material. The mounting bracket 14 is adapted to be fixedly secured to a stud or support member 16 as seen in FIG. 3.

Preferably, the unitary blank of sheet material forming electrical box assembly 10 is a conventional metallic material, such as galvanized steel or aluminum. Due to the unique folding pattern of electrical box assembly 10, the unitary blank of sheet material can be thinner than the sheet material used for conventional electrical boxes and mounting brackets. In particular, the unitary blank of sheet material, preferably has a thickness of about 0.030 inch to about 0.031 inch, while conventional electrical boxes and mounting brackets have a thickness of about 0.0625 inch. The unitary blank of sheet material utilized to construct electrical box assembly 10 is first stamped to form the blank as seen in FIG. 1, and then folded to form an integral, one piece, unitary electrical box assembly 10 as discussed below in more detail. Also, a plurality of conventional break-out windows and/or auxiliary holes (not shown) can be stamped into the unitary blank as needed or desired. Accordingly, electrical box assembly 10 is formed without welding or utilizing separate fastening members or welds.

As seen in FIG. 2, when the unitary blank of sheet material is folded, electrical box assembly 10 forms electrical box 12 and mounting bracket 14. The electrical box 12 of electrical box assembly 10 includes a rear wall portion or panel 20, a first side wall portion or panel 22 coupled to rear wall panel 20 by a first fold line 24, a second side wall portion or panel 26 coupled to rear wall panel 20 by fold line 28, a first end wall portion or panel 30 coupled to rear wall panel 20 by a third fold line 32, and a second end wall portion or panel 34 coupled to rear panel 20 by a fourth fold line 36.

Electrical box 12, as illustrated herein, forms a two inch deep single gang electrical box. Of course, it would be apparent to those skilled in the art, that electrical box 12 could have a variety of shapes or sizes without departing from the subject invention. As seen in FIG. 1, rear wall panel 20, first side wall panel 22 and second side wall panel 26 are flat substantially planar members having substantially the same size. In particular, fold lines 24 and 28 are substantially parallel and form a pair of opposite edges of rear wall panel 20. Fold lines 32 and 36 are substantially parallel and form the second pair of opposite edges of rear wall panel 20.

First side wall panel 22 has a free edge 40 which is substantially parallel to the edge formed by first fold line 24, and a pair of opposite, parallel edges 42 and 44 extending perpendicularly between free edge 40 and fold line 24.

Edges 42 and 44 are substantially aligned with fold lines 32 and 36, respectively. When electrical box 12 is folded, side wall panel 22 is bent along first fold line 24 to extend substantially perpendicular to rear wall panel 20.

Second side wall panel 26 has a free edge 46 extending substantially parallel to the edge formed by second fold line 28, and a pair of opposite, parallel edges 48 and 50 between free edge 46 and fold line 28. Edges 48 and 50 are substantially perpendicular to fold line 28 and free edge 46, and are substantially aligned with fold lines 32 and 36, respectively. When electrical box 12 is folded, second side wall panel 26 is bent along second fold line 28 to extend substantially perpendicular from rear wall panel 20 and substantially parallel to first side wall panel 22.

First end wall panel 30 has a substantially flat, planar, rectangular shape. Accordingly, first end wall panel 30 has a first pair of opposite, parallel edges formed by fold line 32 and a fold line 64 together with a free edge 52, and a second pair of opposite, parallel edges formed by fold line 60 and a free edge 70. A first coupling flap 54 is coupled to first end wall panel 30 by a fold line 56 for engaging first side wall panel 22. A second coupling flap 58 is coupled to first end wall panel 30 by fold line 60 for engaging second side wall panel 26. A wiring device mounting flange 62 is coupled to first end wall panel 30 by fold line 64 for attaching a wiring device (not shown) to electrical box 12. When electrical box 12 is folded, first end wall panel 30 is bent along fold line 32 to extend substantially perpendicular to rear wall panel 20.

First coupling flap 54 is a substantially flat, planar half circular member. When first coupling flap 54 is folded along fold line 56, coupling flap 54 extends substantially perpendicular to first end wall panel 30 for engaging the exterior surface of first side wall panel 22. Accordingly, coupling flap 54 holds first end wall panel 30 substantially perpendicular to first side wall panel 22, and provides rigidity to electrical box 12. Fold line 56 is substantially parallel to edge 70 of first end wall panel 30 and spaced approximately the thickness of first side wall panel 22 from edge 70. Fold line 56 is also substantially parallel to fold line 60.

Second coupling flap 58 is substantially rectangular with a pair of rounded corners, and is bent along fold line 60 to extend substantially perpendicular to first end wall panel 30 for engaging the exterior surface of second side wall panel 26. Accordingly, coupling flap 58 holds first end wall panel 30 substantially perpendicular to second side wall panel 26, and provides rigidity to electrical box 12. Fold line 60 forms one of the edges of first end wall panel 30.

Wiring device mounting flange 62 includes a rectangular mounting portion 72 coupled to first end wall panel 30 by fold line 64, and a grounding portion 74 coupled to mounting portion 72 by a fold line 76. Mounting flange 62 extends between first side wall panel 22 and second side wall panel 26 so that an edge of mounting portion 72 engages second side wall panel 26 and grounding portion 74 engages first side wall panel 22. Accordingly, mounting flange 62 abuts against the interior surfaces of side wall panels 22 and 26 to prevent them from folding inwardly.

Mounting portion 72 is bent along fold line 64 to extend substantially perpendicular to first end wall panel 30 from its free edge 52. Mounting portion 72 has a hole 78 formed therein for receiving a mounting screw (not shown) from a wiring device (not shown). Mounting hole 78 can be either tapped in a conventional manner, or the electrical box assembly 10 can be provided with self-tapping screws so the consumer can tap hole 78 when installing a wiring device.

Grounding portion 74 has a first or central portion 80 which is substantially parallel to mounting portion 72, a second or end portion 82 coupled to first portion 80 by fold line 84, and a third or end portion 86 coupled to first portion 80 by fold line 88 and coupled to mounting portion 72 by fold line 76. Second and third portions 82 and 86 are bent along fold lines 84, 88 and 76 so that they extend substantially perpendicular from first portion 80. First portion 80 has a mounting hole 81 for threadedly receiving a grounding screw (not shown).

Second end wall panel 34 is substantially identical to first end wall panel 30, except that second wall panel 34 is a mirror image of first end wall portion 30.

Second end wall panel 34 has a substantially flat, planar, rectangular shape. Accordingly, second end wall panel 34 has a first pair of opposite, parallel edges formed by fold line 36 and a fold line 104 together with a free edge 91, and a second pair of opposite, parallel edges formed by fold line 90 and a free edge 110. A first coupling flap 94 is coupled to second end wall panel 34 by a fold line 96 for engaging first side wall panel 22. A second coupling flap 98 is coupled to second end wall panel 34 by fold line 90 for engaging second side wall panel 26. A wiring device mounting flange 92 is coupled to second end wall panel 34 by fold line 104 for attaching a wiring device (not shown) to electrical box 12. When electrical box 12 is folded, second end wall panel 34 is bent along fold line 36 to extend substantially perpendicular to rear wall panel 20.

First coupling flap 94 is a substantially flat, planar half circular member. When first coupling flap 94 is folded along fold line 96, coupling flap 94 extends substantially perpendicular to second end wall panel 34 for engaging the exterior surface of first side wall panel 22. Accordingly, coupling flap 94 holds second end wall panel 34 substantially perpendicular to first side wall panel 22, and provides rigidity to electrical box 12. Fold line 96 is substantially parallel to edge 110 of second end wall panel 34 and spaced approximately the thickness of first side wall panel 22 from edge 110. Fold line 96 is also substantially parallel to fold line 90.

Second coupling flap 98 is substantially rectangular with a pair of rounded corners, and is bent along fold line 90 to extend substantially perpendicular to second end wall panel 34 for engaging the exterior surface of second side wall panel 26. Accordingly, coupling flap 98 holds second end wall panel 34 substantially perpendicular to second side wall panel 26, and provides rigidity to electrical box 12. Fold line 90 forms one of the edges of second end wall panel 134. Fold line 90 extends substantially parallel to fold line 28, and is spaced approximately the thickness of second side wall panel 26 from fold line 28.

Wiring device mounting flange 92 includes a rectangular mounting portion 112 coupled to second end wall panel 34 by fold line 104, and a grounding portion 114 coupled to mounting portion 112 by a fold line 116. Mounting flange 92 extends between first side wall panel 22 and second side wall panel 26 so that an edge of mounting portion 112 engages second side wall panel 26 and grounding portion 74 engages first side wall panel 22. Accordingly, mounting flange 92 abuts against the interior surfaces of side wall panels 22 and 26 to prevent them from folding inwardly.

Mounting portion 112 is bent along fold line 104 to extend substantially perpendicular to second end wall panel 34 from its free edge 91. Mounting portion 112 has a hole 118 formed therein for receiving a mounting screw (not shown) from a wiring device (not shown). Mounting hole 118 can be either tapped in a conventional manner, or the electrical box assembly 10 can be provided with self-tapping screws so the consumer can tap hole 118 when installing a wiring device.

Grounding portion 114 has a first or central portion 120 which is substantially parallel to mounting portion 112, a second or end portion 122 coupled to first portion 120 by fold line 124, and a third or end portion 126 coupled to first portion 120 by fold line 128 and coupled to mounting portion 112 by fold line 116. Second and third portions 122 and 126 are bent along fold lines 116, 124 and 128 to extend substantially perpendicular from first portion 120. First portion 120 has a mounting hole 121 for threadedly receiving a grounding screw (not shown).

Bracket 14 includes a first bracket portion 130 and a second bracket portion 132 integrally formed with first side wall panel 22. In particular, first bracket portion 130 is coupled to first side wall panel 22 by fold line 134 which lies on edge 42 of side wall panel 22. Second bracket portion 132 is coupled to side wall panel 22 by fold line 136 which lies on edge 44 of side wall panel 22. Bracket portions 130 and 132 are preferably spaced one-half inch from edge 40 of side wall panel 22 so that electrical box 12 is flush with one-half inch thick dry wall when coupled to support member 16.

First bracket portion 130 includes a first side mounting section 140, a face mounting section 144 with a mounting hole 146, a pair of reinforcing panels 150 and 152 coupled to side mounting section 140 by fold lines 154 and 156, respectively. Side mounting section 140 includes a first portion 158 and a second portion 160 coupled to first portion 158 by fold line 162. First portion 158 is substantially rectangular and extends outwardly from side wall panel 22 at an angle of approximately 135° when assembled as seen in FIG. 3. Second portion 160 extends outwardly from first portion 158 and is substantially parallel to side wall panel 22. Accordingly, side mounting section 140 spaces side wall panel 22 from support member 16 as seen in FIG. 3.

Reinforcing panels 150 and 152 are folded along fold lines 154 and 156 to overlie first and second portions 158 and 160 for doubling the thickness of first bracket portion 130 along first side mounting section 140. Accordingly, reinforcing panels 150 and 152 permit bracket portion 130 to be constructed of a thin sheet material so that face mounting section 144 is a single thickness while side mounting section is a double thickness. This arrangement minimizes the bulging of the dry wall plaster, while still providing a strong and rigid bracket.

Second bracket portion 132 includes a first side mounting section 161, a face mounting section 164 with a mounting hole 166, a pair of reinforcing panels 170 and 172 coupled to side mounting section 161 by fold lines 174 and 176, respectively. Side mounting section 161 includes a first portion 178 and a second portion 180 coupled to first portion 178 by fold line 182. First portion 178 is substantially rectangular and extends outwardly from side wall panel 22 at an angle of approximately 135° when assembled as seen in FIG. 3. Second portion 180 extends outwardly from first portion 178 and is substantially parallel to side wall panel 22. Accordingly, side mounting section 161 spaces side wall panel 22 from the support member 16 as seen in FIG. 3.

Reinforcing panels 170 and 172 are folded along fold lines 174 and 176 to overlie first and second portions 178 and 180 for doubling the thickness of second bracket portion 132 along first side mounting section 161. Accordingly, reinforcing panels 170 and 172 permit bracket portion 132 to be constructed of a thin sheet material so that face mounting section 164 is a single thickness while side mounting section 161 is a double thickness. This arrangement minimizes the bulging of the dry wall plaster, while still providing a strong and rigid bracket.

CONSTRUCTION OF ELECTRICAL BOX ASSEMBLY 10

In constructing electrical box assembly 10, first a blank is stamped out of sheet metal as seen in FIG. 1. Then, electrical box 12 and mounting bracket 14 are formed by bending the blank of sheet metal along the various fold lines illustrated by broken lines in FIG. 1. It will be apparent to those skilled in the art once given this disclosure that the blank of sheet metal generally does not have to be bent along the fold lines in any particular order.

ELECTRICAL BOX ASSEMBLY 210 OF FIGS. 7 AND 8

Figure 7:
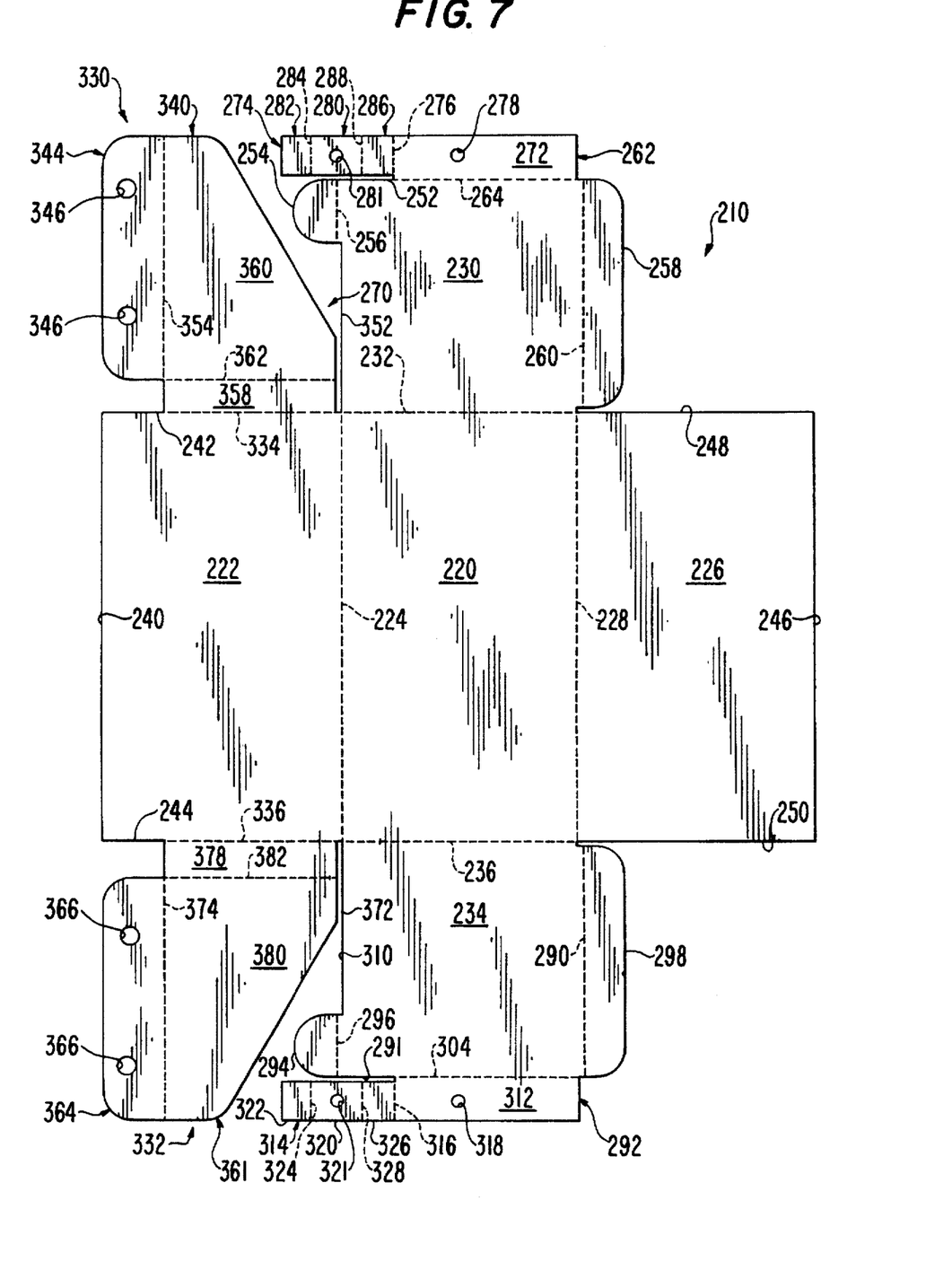
FIG. 7 is a top plan view of a unitary blank of sheet material with fold lines indicated by broken lines for constructing an electrical box with a mounting bracket in accordance with a second embodiment of the present invention.
Figure 8:
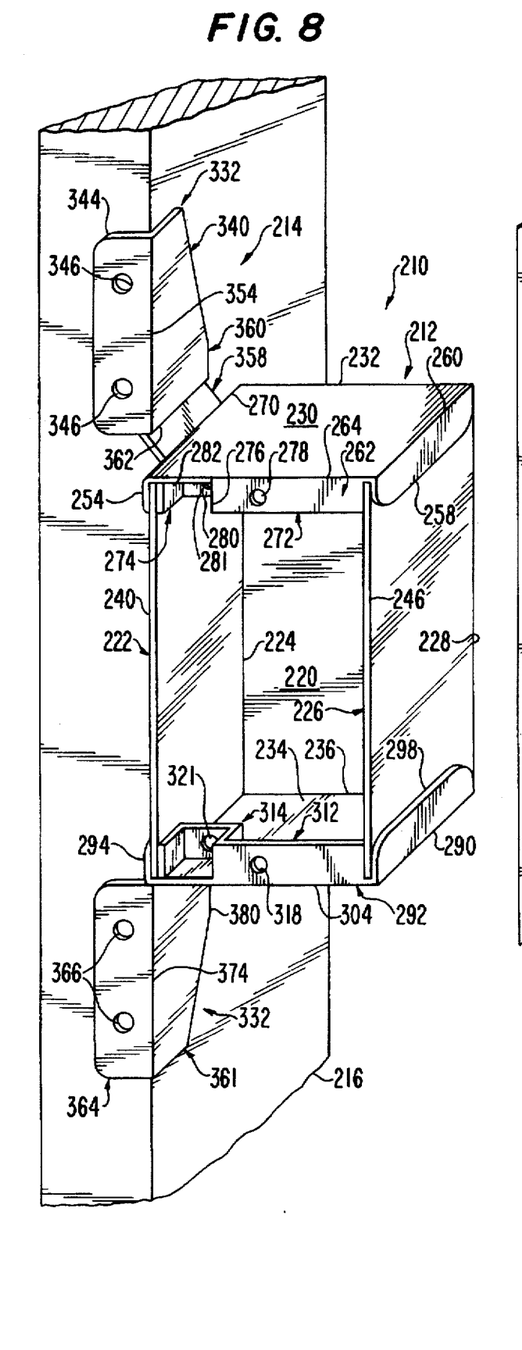
FIG. 8 is a right, front perspective view of an electrical box with a mounting bracket formed by folding the unitary blank of sheet material illustrated in FIG. 7.

Initially referring to FIGS. 7 and 8, an electrical box assembly 210 in accordance with the present invention is illustrated, and includes an electrical box or housing 212 in the form of a wall or junction box and an integral mounting bracket 214 formed by folding a unitary, one-piece blank of sheet material. The mounting bracket 214 is adapted to be fixedly secured to a stud or support member 216 as seen in FIG. 8. Electrical box assembly 210 is substantially identical to electrical box assembly 10 as discussed above, except that the mounting bracket 14 has been modified. Thus, electrical box assembly 210 will not be illustrated in detail herein.

Preferably, the unitary blank of sheet material forming electrical box assembly 210 is a conventional metallic material, such as galvanized steel or aluminum. Due to the unique folding pattern of electrical box assembly 210, the unitary blank of sheet material can be thinner than the sheet material used for conventional electrical boxes and mounting brackets. In particular, the unitary blank of sheet material, preferably has a thickness of about 0.030 inch to about 0.031 inch, while conventional electrical boxes and mounting brackets have a thickness of about 0.0625 inch. The unitary blank of sheet material utilized to construct electrical box assembly 210 is first stamped to form the blank as seen in FIG. 7, and then folded to form an integral, one piece, unitary electrical box assembly 210 as discussed below in more detail. Also, a plurality of conventional break-out windows and/or auxiliary holes (not shown) can be stamped into the unitary blank as needed or desired. Accordingly, electrical box assembly 210 is formed without welding or utilizing separate fastening members or welds.

As seen in FIG. 8, when the unitary blank of sheet material is folded, electrical box assembly 210 forms electrical box 212 and mounting bracket 214. The electrical box 212 of electrical box assembly 210 includes a rear wall portion or panel 220, a first side wall portion or panel 222 coupled to rear wall panel 220 by a first fold line 224, a second side wall portion or panel 226 coupled to rear wall panel 220 by fold line 228, a first end wall portion or panel 230 coupled to rear wall panel 220 by a third fold line 232, and a second end wall portion or panel 234 coupled to rear panel 220 by a fourth fold line 236.

Electrical box 212, as illustrated herein, forms a two inch deep single gang electrical box. Of course, it would be apparent to those skilled in the art, that electrical box 212 could have a variety of shapes or sizes without departing from the subject invention. As seen in FIGS. 7 and 8, rear wall panel 220, first side wall panel 222 and second side wall panel 226 are flat substantially planar members having substantially the same size. In particular, fold lines 224 and 228 are substantially parallel and form a pair of opposite edges of rear wall panel 220. Fold lines 232 and 236 are substantially parallel and form the second pair of opposite edges of rear wall panel 220.

First side wall panel 222 has a free edge 240 which is substantially parallel to the edge formed by first fold line 224, and a pair of opposite, parallel edges 242 and 244 extending perpendicularly between free edge 240 and fold line 224. Edges 242 and 244 are substantially aligned with fold lines 232 and 236, respectively. When electrical box 212 is folded, side wall panel 222 is bent along first fold line 224 to extend substantially perpendicular to rear wall panel 220.

Second side wall panel 226 has a free edge 246 extending substantially parallel to the edge formed by second fold line 228, and a pair of opposite, parallel edges 248 and 250 between free edge 246 and fold line 228. Edges 248 and 250 are substantially perpendicular to fold line 228 and free edge 246, and are substantially aligned with fold lines 232 and 236, respectively. When electrical box 212 is folded, second side wall panel 226 is bent along second fold line 228 to extend substantially perpendicular from rear wall panel 220 and substantially parallel to first side wall panel 222.

First end wall panel 230 has a substantially flat, planar, rectangular shape. Accordingly, first end wall panel 230 has a first pair of opposite, parallel edges formed by fold line 232 and a fold line 264 together with a free edge 252, and a second pair of opposite, parallel edges formed by fold line 260 and a free edge 270. A first coupling flap 254 is coupled to first end wall panel 230 by a fold line 256 for engaging first side wall panel 222. A second coupling flap 258 is coupled to first end wall panel 230 by fold line 260 for engaging second side wall panel 226. A wiring device mounting flange 262 is coupled to first end wall panel 230 by fold line 264 for attaching a wiring device (not shown) to electrical box 212. When electrical box 212 is folded, first end wall panel 230 is bent along fold line 232 to extend substantially perpendicular to rear wall panel 220.

First coupling flap 254 is a substantially flat, planar half circular member. When first coupling flap 254 is folded along fold line 256, coupling flap 254 extends substantially perpendicular to first end wall panel 230 for engaging the exterior surface of first side wall panel 222. Accordingly, coupling flap 254 holds first end wall panel 230 substantially perpendicular to first side wall panel 222, and provides rigidity to electrical box 212. Fold line 256 is substantially parallel to edge 270 of first end wall panel 230 and spaced approximately the thickness of first side wall panel 222 from edge 270. Fold line 256 is also substantially parallel to fold line 260.

Second coupling flap 258 is substantially rectangular with a pair of rounded corners, and is bent along fold line 260 to extend substantially perpendicular to first end wall panel 230 for engaging the exterior surface of second side wall panel 226. Accordingly, coupling flap 258 holds first end wall panel 230 substantially perpendicular to second side wall panel 226, and provides rigidity to electrical box 212. Fold line 260 forms one of the edges of first end wall panel 230.

Wiring device mounting flange 262 includes a rectangular mounting portion 272 coupled to first end wall panel 230 by fold line 264, and a grounding portion 274 coupled to mounting portion 272 by a fold line 276. Mounting flange 262 extends between first side wall panel 222 and second side wall panel 226 so that an edge of mounting portion 272 engages second side wall panel 226 and grounding portion 274 engages first side wall panel 222. Accordingly, mounting flange 262 abuts against the interior surfaces of side wall panels 222 and 226 to prevent them from folding inwardly.

Mounting portion 272 is bent along fold line 264 to extend substantially perpendicular to first end wall panel 230 from its free edge 252. Mounting portion 272 has a hole 278 formed therein for receiving a mounting screw (not shown) from a wiring device (not shown). Mounting hole 278 can be either tapped in a conventional manner, or the electrical box assembly 210 can be provided with self-tapping screws so the consumer can tap hole 278 when installing a wiring device.

Grounding portion 274 has a first or central portion 280 which is substantially parallel to mounting portion 272, a second or end portion 282 coupled to first portion 280 by fold line 284, and a third or end portion 286 coupled to first portion 280 by fold line 288 and coupled to mounting portion 272 by fold line 276. Second and third portions 282 and 286 are bent along fold lines 284, 288 and 276 so that they extend substantially perpendicular from first portion 280. First portion 280 has a mounting hole 281 for threadedly receiving a grounding screw (not shown).

Second end wall panel 234 is substantially identical to first end wall panel 230, except that second wall panel 234 is a mirror image of first end wall portion 230.

Second end wall panel 234 has a substantially flat, planar, rectangular shape. Accordingly, second end wall panel 234 has a first pair of opposite, parallel edges formed by fold line 236 and a fold line 304 together with a free edge 291, and a second pair of opposite, parallel edges formed by fold line 290 and a free edge 310. A first coupling flap 294 is coupled to second end wall panel 234 by a fold line 296 for engaging first side wall panel 222. A second coupling flap 298 is coupled to second end wall panel 234 by fold line 290 for engaging second side wall panel 226. A wiring device mounting flange 292 is coupled to second end wall panel 234 by fold line 304 for attaching a wiring device (not shown) to electrical box 212. When electrical box 212 is folded, second end wall panel 234 is bent along fold line 236 to extend substantially perpendicular to rear wall panel 220.

First coupling flap 294 is a substantially flat, planar half circular member. When first coupling flap 294 is folded along fold line 296, coupling flap 294 extends substantially perpendicular to second end wall panel 234 for engaging the exterior surface of first side wall panel 222. Accordingly, coupling flap 294 holds second end wall panel 234 substantially perpendicular to first side wall panel 222, and provides rigidity to electrical box 212. Fold line 296 is substantially parallel to edge 310 of second end wall panel 234 and spaced approximately the thickness of first side wall panel 222 from edge 310. Fold line 296 is also substantially parallel to fold line 290.

Second coupling flap 298 is substantially rectangular with a pair of rounded corners, and is bent along fold line 290 to extend substantially perpendicular to second end wall panel 234 for engaging the exterior surface of second side wall panel 226. Accordingly, coupling flap 298 holds second end wall panel 234 substantially perpendicular to second side wall panel 226, and provides rigidity to electrical box 212. Fold line 290 forms one of the edges of second end wall panel 334. Fold line 290 extends substantially parallel to fold line 228, and is spaced approximately the thickness of second side wall panel 226 from fold line 228.

Wiring device mounting flange 292 includes a rectangular mounting portion 312 coupled to second end wall panel 234 by fold line 304, and a grounding portion 314 coupled to mounting portion 312 by a fold line 316. Mounting flange 292 extends between first side wall panel 222 and second side wall panel 226 so that an edge of mounting portion 312 engages second side wall panel 226 and grounding portion 274 engages first side wall panel 222. Accordingly, mounting flange 292 abuts against the interior surfaces of side wall panels 222 and 226 to prevent them from folding inwardly.

Mounting portion 312 is bent along fold line 304 to extend substantially perpendicular to second end wall panel 234 from its free edge 291. Mounting portion 312 has a hole 318 formed therein for receiving a mounting screw (not shown) from a wiring device (not shown). Mounting hole 318 can be either tapped in a conventional manner, or the electrical box assembly 210 can be provided with self-tapping screws so the consumer can tap hole 318 when installing a wiring device.

Grounding portion 314 has a first or central portion 320 which is substantially parallel to mounting portion 312, a second or end portion 322 coupled to first portion 320 by fold line 324, and a third or end portion 326 coupled to first portion 320 by fold line 328 and coupled to mounting portion 312 by fold line 316. Second and third portions 322 and 326 are bent along fold lines 316, 324 and 328 to extend substantially perpendicular from first portion 320. First portion 320 has a mounting hole 321 for threadedly receiving a grounding screw (not shown).

Bracket 214 includes a first bracket portion 330 and a second bracket portion 332 integrally formed with first side wall panel 222. In particular, first bracket portion 330 is coupled to first side wall panel 222 by fold line 334 which lies on edge 242 of side wall panel 222. Second bracket portion 332 is coupled to side wall panel 222 by fold line 336 which lies on edge 244 of side wall panel 222. Bracket portions 330 and 332 are preferably spaced one-half inch from edge 240 of side wall panel 222 so that electrical box 212 is flush with one-half inch thick dry wall when coupled to support member 216.

First bracket portion 330 includes a first side mounting section 340, a face mounting section 344 with a pair of mounting holes 346 coupled to mounting section 340 by fold line 354. Side mounting section 340 includes a first portion 358 and a second portion 360 coupled to first portion 358 by fold line 362. First portion 358 is substantially rectangular and extends outwardly from side wall panel 322 at an angle of approximately 135° when assembled. Second portion 360 extends outwardly from first portion 358 and is substantially parallel to side wall panel 222. Accordingly, side mounting section 340 spaces side wall panel 222 from support member 216 as seen in FIG. 8.

Second bracket portion 332 includes a first side mounting section 361, a face mounting section 364 with a pair of mounting holes 366 coupled to mounting section 361 by fold line 374. Side mounting section 361 includes a first portion 378 and a second portion 380 coupled to first portion 378 by fold line 382. First portion 378 is substantially rectangular and extends outwardly from side wall panel 222 at an angle of approximately a 135° when assembled. Second portion 380 extends outwardly from first portion 378 and is substantially parallel to side wall panel 222. Accordingly, side mounting section 361 spaces side wall panel 222 from the support member 216 as seen in FIG. 8.

ELECTRICAL BOX 410 OF FIGS. 9 AND 10

Figure 9:
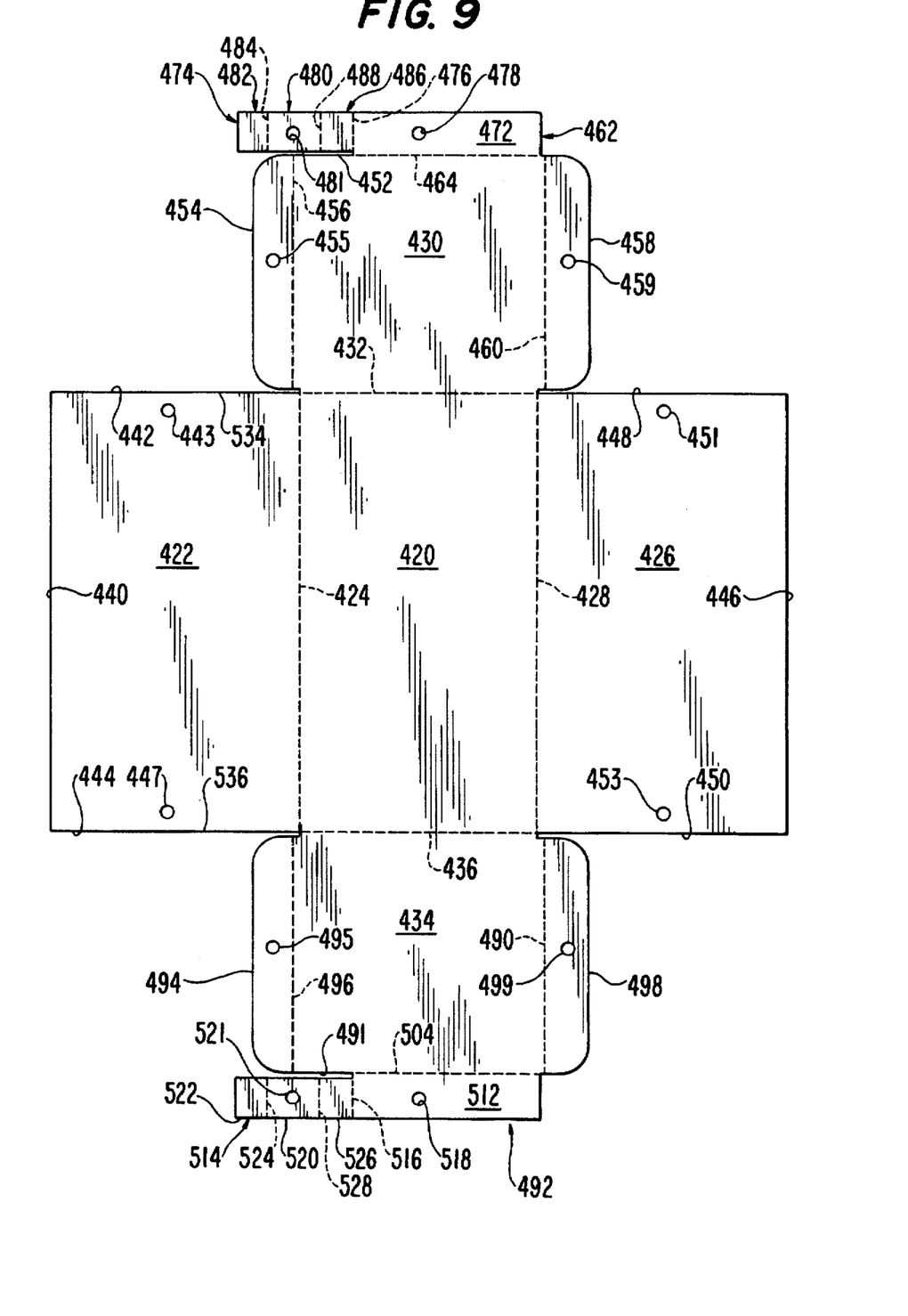
FIG. 9 is a top plan view of a unitary blank of sheet material with fold lines indicated by broken lines for constructing an electrical box in accordance with a third embodiment of the present invention.
Figure 10:
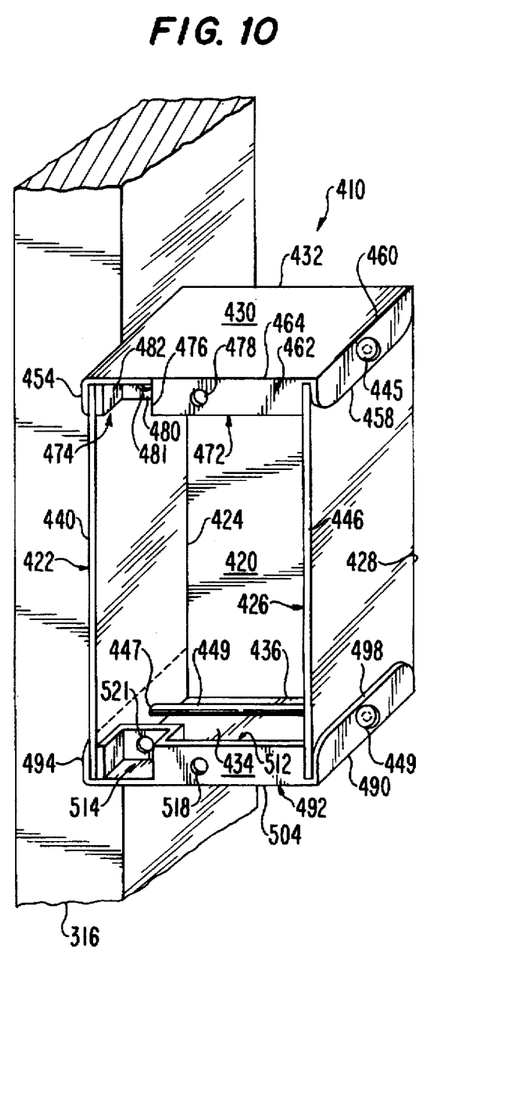
FIG. 10 is a right, front perspective view of an electrical box formed by folding the unitary blank of sheet material illustrated in FIG. 9.

Initially referring to FIGS. 9 and 10, an electrical box 410 in accordance with the present invention is illustrated in the form of a wall or junction box. Electrical box 410 is formed by folding a unitary, one-piece of blank of sheet material shown in FIG. 9. Electrical box 410 is substantially identical to electrical box 12 as discussed above, except that mounting bracket 14 has been removed and coupling flanges 54 and 94 of electrical box 12 have been modified. Thus, electrical box 410 will not be illustrated in detail herein.

Preferably, the unitary blank of sheet material forming electrical box 410 is a conventional metallic material, such as galvanized steel or aluminum. Due to the unique folding pattern of electrical box 410, the unitary blank of sheet material can be thinner than the sheet material used for conventional folded electrical boxes. In particular, the unitary blank of sheet material, preferably has a thickness of about 0.030 inch to about 0.031 inch, while conventional electrical boxes and mounting brackets have a thickness of about 0.0625 inch. The unitary blank of sheet material utilized to construct electrical box 410 is first stamped to form the blank as seen in FIG. 9, and then folded to form an integral, one piece, unitary electrical box 410 as discussed below in more detail. Also, a plurality of conventional break-out windows and/or auxiliary holes (not shown) can be stamped into the unitary blank as needed or desired. Accordingly, electrical box 410 is formed without welding or utilizing separate fastening members or welds.

As seen in FIG. 10, the unitary blank of sheet material is folded to form electrical box 410. The electrical box 410 includes a rear wall portion of panel 420, a first side wall portion or panel 422 coupled to rear wall panel 420 by a first fold line 424, a second side wall portion or panel 426 coupled to rear wall panel 420 by fold line 428, a first end wall portion or panel 430 coupled to rear wall panel 420 by a third fold line 432, and a second end wall portion or panel 434 coupled to rear panel 420 by a fourth fold line 436.

Electrical box 410, as illustrated herein, forms a two inch deep single gang electrical box. Of course, it would be apparent to those skilled in the art, that electrical box 410 could have a variety of shapes or sizes without departing from the subject invention. As seen in FIGS. 9 and 10, rear wall panel 420, first side wall panel 422 and second side wall panel 426 are flat substantially planar members having substantially the same size. In particular, fold lines 424 and 428 are substantially parallel and form a pair of opposite edges of rear wall panel 420. Fold lines 432 and 436 are substantially parallel and form the second pair of opposite edges of rear wall panel 420.

First side wall panel 422 has a free edge 440 which is substantially parallel to the edge formed by first fold line 424, and a pair of opposite, parallel edges 442 and 444 extending perpendicularly between free edge 440 and fold line 424. Edges 442 and 444 are substantially aligned with fold lines 432 and 436, respectively. Adjacent edge 442 of first side wall panel 422 is a mounting hole 443 for receiving a first mounting nail 445 therethrough. Adjacent edge 444 of first side wall panel 422 is a mounting hole 447 for receiving a second mounting nail 449 therethrough. When electrical box 410 is folded, side wall panel 422 is bent along first fold line 424 to extend substantially perpendicular to rear wall panel 420.

Second side wall panel 426 has a free edge 446 extending substantially parallel to the edge formed by second fold line 428, and a pair of opposite, parallel edges 448 and 450 between free edge 446 and fold line 428. Edges 448 and 450 are substantially perpendicular to fold line 428 and free edge 446, and are substantially aligned with fold lines 432 and 436, respectively. Adjacent edge 448 is a mounting hole 451 for receiving first mounting nail 445 therethrough. Likewise, adjacent edge 450 of second side wall panel 426 is a mounting hole 453 for receiving second mounting nail 449 therethrough. When electrical box 410 is folded, second side wall panel 426 is bent along second fold line 428 to extend substantially perpendicular from rear wall panel 420 and substantially parallel to first side wall panel 422.

First end wall panel 430 has a substantially flat, planar, rectangular shape. Accordingly, first end wall panel 430 has a first pair of opposite, parallel edges formed by fold line 432 and a fold line 464 together with a free edge 452, and a second pair of opposite, parallel edges formed by fold line 460 and fold line 456. A first coupling flap 454 is coupled to first end wall panel 430 by fold line 456 for engaging first side wall panel 422. A second coupling flap 458 is coupled to first end wall panel 430 by fold line 460 for engaging second side wall panel 426. A wiring device mounting flange 462 is coupled to first end wall panel 430 by fold line 464 for attaching a wiring device (not shown) to electrical box 410. When electrical box 410 is folded, first end wall panel 430 is bent along fold line 432 to extend substantially perpendicular to rear wall panel 420.

First coupling flap 454 is a substantially flat, planar rectangular member with a pair of rounded corners. When first coupling flap 454 is folded along fold line 456 coupling flap 454 extends substantially perpendicular to first end wall panel 430 for engaging the exterior surface of first side wall panel 422. Accordingly, coupling flap 454 holds first end wall panel 430 substantially perpendicular to first side wall panel 422, and provides rigidity to electrical box 410. Coupling flap 454 has a mounting hole 455 which is aligned with mounting hole 443 in first side wall panel 422 for receiving mounting nail 445 therethrough. Fold line 456 forms one of the edges of first end wall panel 430. Fold line 456 is also substantially parallel to fold line 460 and offset from fold line 424 by the thickness of side wall panel 422.

Second coupling flap 458 is substantially rectangular with a pair of rounded corners, and is bent along fold line 460 to extend substantially perpendicular to first end wall panel 430 for engaging the exterior surface of second side wall panel 426. Accordingly, coupling flap 458 holds first end wall panel 430 substantially perpendicular to second side wall panel 426, and provides rigidity to electrical box 410. Coupling flap 458 has a mounting hole 459 which is aligned with mounting hole 451 in side wall panel 422 for receiving mounting nail 445 therethrough. Nail 445 also prevents the outward unfolding of first end wall panel 430 after installation, since nail 445 fixedly couples coupling flaps 454 and 458 to side wall panels 422 and 426, respectively. Fold line 460 forms one of the edges of first end wall panel 430 and is offset from fold line 428 by the thickness of side wall panel 426.

Wiring device mounting flange 462 includes a rectangular mounting portion 472 coupled to first end wall panel 430 by fold line 464, and a grounding portion 474 coupled to mounting portion 472 by a fold line 476. Mounting flange 462 extends between first side wall panel 422 and second side wall panel 426 so that an edge of mounting portion 472 engages second side wall panel 426 and grounding portion 474. Accordingly, mounting flange 462 abuts against the interior surfaces of side wall panels 422 and 426 to prevent them from folding inwardly.

Mounting portion 472 is bent along fold line 464 to extend substantially perpendicular to first end wall panel 430 from its free edge 452. Mounting portion 472 has a hole 478 formed therein for receiving a mounting screw (not shown) from a wiring device (not shown). Mounting hole 478 can be either tapped in a conventional manner, or the electrical box 410 can be provided with self-tapping screws so the consumer can tap hole 478 when installing a wiring device.

Grounding portion 474 has a first or central portion 480 which is substantially parallel to mounting portion 472, a second or end portion 482 coupled to first portion 480 by fold line 484, and a third or end portion 486 coupled to first portion 480 by fold line 488 and coupled to mounting portion 472 by fold line 476. Second and third portions 482 and 486 are bent along fold lines 484, 488 and 476 so that they extend substantially perpendicular from first portion 480. First portion 480 has a mounting hole 481 for threadedly receiving a grounding screw (not shown).

Second end wall panel 434 is substantially identical to first end wall panel 430, except that second wall panel 434 is a mirror image of first end wall portion 430.

Second end wall panel 434 has a substantially flat, planar, rectangular shape. Accordingly, second end wall panel 434 has a first pair of opposite, parallel edges formed by fold line 436 and a fold line 504 together with a free edge 491, and a second pair of opposite, parallel edges formed by fold line 490 and fold line 496.

A first coupling flap 494 is coupled to second end wall panel 434 by fold line 496 for engaging first side wall panel 422. Fold line 496 is offset from fold line 424 by the thickness of side wall panel 422 so that first coupling flap 494 can be folded to overlie the exterior surface of side wall panel 422. A second coupling flap 498 is coupled to second end wall panel 434 by fold line 490 for engaging second side wall panel 426. Fold line 490 is offset from fold line 428 by the thickness of side wall panel 426 so that second coupling flap 498 can be folded to overlie the exterior surface of side wall panel 426. A wiring device mounting flange 492 is coupled to second end wall panel 434 by fold line 504 for attaching a wiring device (not shown) to electrical box 410. When electrical box 410 is folded, second end wall panel 434 is bent along fold line 436 to extend substantially perpendicular to rear wall panel 420.

First coupling flap 494 is a substantially flat, planar rectangular member with a pair of rounded corners. When first coupling flap 494 is folded along fold line 496, coupling flap 494 extends substantially perpendicular to second end wall panel 434 for engaging the exterior surface of first side wall panel 422. Coupling flap 494 has a mounting hole 495 which is aligned with mounting hole 447 in first side wall panel 422 for receiving mounting nail 449 therethrough. Accordingly, coupling flap 494 holds second end wall panel 434 substantially perpendicular to first side wall panel 422, and provides rigidity to electrical box 410. Fold line 496 forms one of the edges of second end wall panel 434 and extends substantially parallel to fold line 490.

Second coupling flap 498 is substantially rectangular with a pair of rounded corners, and is bent along fold line 490 to extend substantially perpendicular to second end wall panel 434 for engaging the exterior surface of second side wall panel 426. Coupling flap 498 has a mounting hole 499 which is aligned with mounting hole 453 in second side wall panel 426 for receiving mounting nail 449 therethrough. Accordingly, coupling flap 498 holds second end wall panel 434 substantially perpendicular to second side wall panel 426, and provides rigidity to electrical box 410. In other words, nail 449 prevents the outward unfolding of first end wall panel 434 after installation, since nail 449 fixedly secures coupling flaps 494 and 498 to side wall panels 422 and 426, respectively. Fold line 490 forms one of the edges of second end wall panel 434 and extends substantially parallel to fold line 428. Also, fold line 490 is spaced approximately the thickness of second side wall panel 426 from fold line 428.

Wiring device mounting flange 492 includes a rectangular mounting portion 512 coupled to second end wall panel 434 by fold line 504, and a grounding portion 514 coupled to mounting portion 512 by a fold line 516. Mounting flange 492 extends between first side wall panel 422 and second side wall panel 426 so that an edge of mounting portion 512 engages second side wall panel 426 and grounding portion 514 engages first side wall panel 422. Accordingly, mounting flange 492 abuts against the interior surfaces of side wall panels 422 and 426 to prevent them from folding inwardly.

Mounting portion 512 is bent along fold line 504 to extend substantially perpendicular to second end wall panel 434 from its free edge 491. Mounting portion 512 has a hole 518 formed therein for receiving a mounting screw (not shown) from a wiring device (not shown). Mounting hole 518 can be either tapped in a conventional manner, or the electrical box 410 can be provided with self-tapping screws so the consumer can tap hole 518 when installing a wiring device.

Grounding portion 514 has a first or central portion 520 which is substantially parallel to mounting portion 512, a second or end portion 522 coupled to first portion 520 by fold line 524, and a third or end portion 526 coupled to first portion 520 by fold line 528 and coupled to mounting portion 512 by fold line 516. Second and third portions 522 and 526 are bent along fold lines 516, 524 and 528 to extend substantially perpendicular from first portion 520. First portion 520 has a mounting hole 521 for threadedly receiving a grounding screw (not shown).

Electrical box 410 could be sold with captive nails 445 and 449 which are retained in the respective holes of the electrial box 410 in a conventional manner to prevent unfolding and to allow fast installation. For example, nails 445 and 449 can be sized to be frictionally retained in the holes of electrical box 410, or can be provided with detents or barbs which prevent removal of the nails 445 and 449 from the holes in the electrical box 410.

Of course, each of the electrical boxes 10, 210 and 410 can be manufactured and sold as a fully folded electrical box as seen in FIGS. 2, 8 and 10, or as a flat blank as seen in FIGS. 1, 7 and 9. If manufactured for sale as a flat blank, then the fold lines of each of the electrical boxes 10, 210 and 410 could be creased during stamping of the blank so that the installer could fold the electrical box at the job site. A stack of blanks one inch high would contain approximately 32 unfolded electrical boxes. Thus, the size of the shipping container for unfolded electrical boxes (blanks) would be greatly reduced over the shipping container for folded electrical boxes.

While only three embodiments have been chosen to illustrate the present invention, it will be understood by those skilled in the art that various changes and modifications can be made herein without departing from the scope of the invention as defined in the appended claims.

What is claimed is:

1. An electrical box assembly, comprising:

an electrical box having an open front face, a rear wall, a pair of side walls extending substantially perpendicular to said rear wall, and a pair of end walls extending substantially perpendicular to said rear wall and said side walls; and a metal mounting bracket including a pair of bracket portions integrally formed with one of said walls of said electrical box as a unitary, one-piece member, with each of said bracket portions having a first side mounting portion for engaging a first surface of a support member, a second side mounting portion coupled to said first side mounting portion by a first fold line and extending between and inclined relative to both said first side mounting portion and said one of said walls, a face mounting portion perpendicularly coupled to said first side mounting portion by a second fold line for engaging a second surface of the support member, and a first reinforcing panel coupled to its respective said first and second side mounting portions by a third fold line and bent to overlie its respective said first and second side mounting portions and its respective said first fold line, each of said face mounting portions having a first thickness and each of said first and second side mounting portions together with its said reinforcing panel having a second thickness at least approximately twice said first thickness of said face mounting portion.

2. An electrical box assembly according to claim 1, wherein each of said bracket portions includes a second reinforcing panel coupled thereto by a fold line bent to overlie part of its respective said bracket portion.

3. An electrical box formed by folding a unitary blank of sheet material, comprising:

a substantially planar rear panel;

a first substantially planar side panel coupled to said rear panel by a first fold line and extending substantially perpendicular to said rear panel, said first side panel having first and second end edges;

a second substantially planar side panel coupled to said rear panel by a second fold line and extending substantially perpendicular to said rear panel, said second side panel having first and second end edges;

a first substantially planar end panel coupled to said rear panel by a third fold line and extending substantially perpendicular to said rear panel with its interior surface engaging said first end edges of said first and second side panels to limit inward movement of said first end panel;

a second substantially planar end panel coupled to said rear panel by a fourth fold line and extending substantially perpendicular to said rear panel with its interior surface engaging said second end edges of said first and second side panels to limit inward movement of said second end panel;

a first mounting flange coupled to said first end panel by a fifth fold line extending substantially parallel to said third fold line and extending substantially perpendicular to said first end panel;

a second mounting flange coupled to said second end panel by a sixth fold line extending substantially parallel to said fourth fold line and extending substantially perpendicular to said second end panel;

a first pair of coupling flaps coupled to opposite edges of said first end panel by seventh and eighth fold lines, respectively, so that one of said first pair of coupling flaps overlies an exterior surface portion of said first side panel and the other of said first pair of coupling flaps overlies an exterior surface portion of said second side panel to prevent outward movement of said side panels, said first coupling flaps extending substantially the entire length of said opposite edges of said first end panel, respectively;

a second pair of coupling flaps coupled to opposite edges of said second end panel by ninth and tenth fold lines, respectively, so that one of said second pair of coupling flaps overlies an exterior surface portion of said first side panel and the other of said second pair of coupling flaps overlies an exterior surface portion of said second side panel to prevent outward movement of said first and second side panels, said second pair of coupling flaps extending substantially the entire length of said opposite edges of said second end panel, respectively; and first and second mounting fasteners for mounting said electrical box to a support member;

each of said first coupling flaps having a first box mounting hole extending therethrough and each of said side panels having a second box mounting hole extending therethrough such that said first and second box mounting holes are aligned with each other and receive said first mounting fastener through each of said first holes and each of said second holes to secure said box to the support member, and each of said second coupling flaps having a third box mounting hole extending therethrough and each of said side panels having a fourth box mounting hole extending therethrough such that said third and fourth box mounting holes are aligned with each other and receive said second mounting fastener through each of said first holes and each of said second holes to secure said box to the support member.

4. An electrical box according to claim 3, wherein said first mounting flange having one end positioned adjacent said first side panel and its other end positioned adjacent said second side panel for limiting inward movement of said first and second side panels; and said second mounting flange having one end positioned adjacent said first side panel and its other end positioned adjacent said second side panel for limiting inward movement of said first and second side panels.

5. An electrical box assembly, comprising:

an electrical box having an open front face, a rear wall, a pair of side walls extending substantially perpendicular to said rear wall, and a pair of end walls extending substantially perpendicular to said rear wall and said side walls; and a metal mounting bracket including a pair of bracket portions integrally formed with one of said walls of said electrical box as a unitary, one-piece member, with each of said bracket portions having a side mounting portion for engaging a first surface of a support member, a face mounting portion perpendicularly coupled to said side mounting portion by a first fold line for engaging a second surface of the support member, and a first reinforcing panel coupled to its respective said side mounting portion by a second fold line and bent to overlie its respective said side mounting portion, each of said side mounting portions having a longitudinal axis and said second fold line extending substantially parallel to said longitudinal axis, each of said face mounting portions having a first thickness and each of said side mounting portions together with its said reinforcing panel having a second thickness at least approximately twice said first thickness of said face mounting portion.

6. An electrical box assembly according to claim 5, wherein each of said bracket portions includes a second reinforcing panel coupled thereto by a third fold line bent to overlie part of its respective said bracket portion, said third fold line being parallel to said second fold line.

* * * * *